UNITED STATES PATENT OFFICE.

ALEXANDER MILES, OF DULUTH, MINNESOTA.

HAIR-TONIC.

SPECIFICATION forming part of Letters Patent No. 289,922, dated December 11, 1883.

Application filed June 26, 1883. (No specimens.)

*To all whom it may concern:*

Be it known that I, ALEXANDER MILES, of Duluth, Minnesota, a citizen of the United States, have invented an Improved Hair Dressing or Tonic, of which the following is a specification.

The object of my invention is to produce an agreeable dressing for the hair, and one which will stimulate its growth and improve its quality.

I take the following ingredients, preferably in the proportions stated; but it is to be understood the different ingredients may be varied more or less without destroying the identity or characteristics of the compound: pine-tar, two and one-half ounces; magnesia carbonate, five ounces; glycerine, ten ounces; alcohol, thirty-eight and one-half ounces; quinia sulphate, one hundred and fifty-six grains; water, seventy-seven ounces; extract of sage, six ounces, representing strength of three ounces sage herb. The ingredients are mixed as follows: The tar and magnesia are well rubbed together and filtered. The other ingredients are then mixed and filtered, and then the tar and magnesia added. The proportions above given will make about one gallon.

This dressing can be applied to the hair in the usual way as often as desired, and will be found a most pleasant and invigorating tonic for the hair.

I claim as my invention—

The herein-described hair dressing or tonic, composed of pine-tar, magnesia carbonate, glycerine, alcohol, quinia sulphate, extract of sage, and water, in about the proportions stated.

In testimony whereof I have hereunto subscribed my name this 22d day of June, A. D. 1883.

ALEXANDER MILES.

Witnesses:
 DANL. G. CASH,
 DAVID C. BURREY.